No. 848,406. PATENTED MAR. 26, 1907.
W. W. TAINTER & G. P. STANLEY.
TOOTHPICK MACHINE.
APPLICATION FILED NOV. 6, 1905.

2 SHEETS—SHEET 1.

Witnesses:
J. Henry Parker
Aline Tarr

Inventors
Willis W. Tainter
George P. Stanley
by Macleod, Calver, Copeland & Dike
Attorneys.

No. 848,406. PATENTED MAR. 26, 1907.
W. W. TAINTER & G. P. STANLEY.
TOOTHPICK MACHINE.
APPLICATION FILED NOV. 6, 1905.

2 SHEETS—SHEET 2.

Witnesses:
J. Henry Parker
Almie Farr

Inventors
Willis W. Tainter
George P. Stanley
by Macleod, Calver, Copeland & Dike
Attorneys.

UNITED STATES PATENT OFFICE.

WILLIS W. TAINTER AND GEORGE P. STANLEY, OF DIXFIELD, MAINE.

TOOTHPICK-MACHINE.

No. 848,406.　　　Specification of Letters Patent.　　　Patented March 26, 1907.

Application filed November 6, 1905. Serial No. 285,953.

*To all whom it may concern:*

Be it known that we, WILLIS W. TAINTER and GEORGE P. STANLEY, citizens of the United States, residing at Dixfield, county of Oxford, State of Maine, have invented a certain new and useful Improvement in Toothpick-Machines, of which the following is a specification, reference being had therein to the accompanying drawings.

In the manufacture of fine wood toothpicks it is necessary that the toothpick-blank be nicely pointed and polished after it has been cut from the sheet of veneer from which it is made. The toothpick-blank is square in cross-section and substantially pyramidal in shape at each end. The finishing of the toothpick is for the purpose of rendering the finished article substantially circular in cross-section and conical in shape at the ends and providing it with suitable points.

The invention has for its object to provide a machine which will perform this operation automatically upon the toothpick-blanks and turn out perfectly-finished articles at a minimum of expense.

The invention will be fully understood from the following description, taken in connection with the accompanying drawings, and the novel features thereof wil be pointed out and clearly defined in the claims at the close of this specification.

Figure 1:
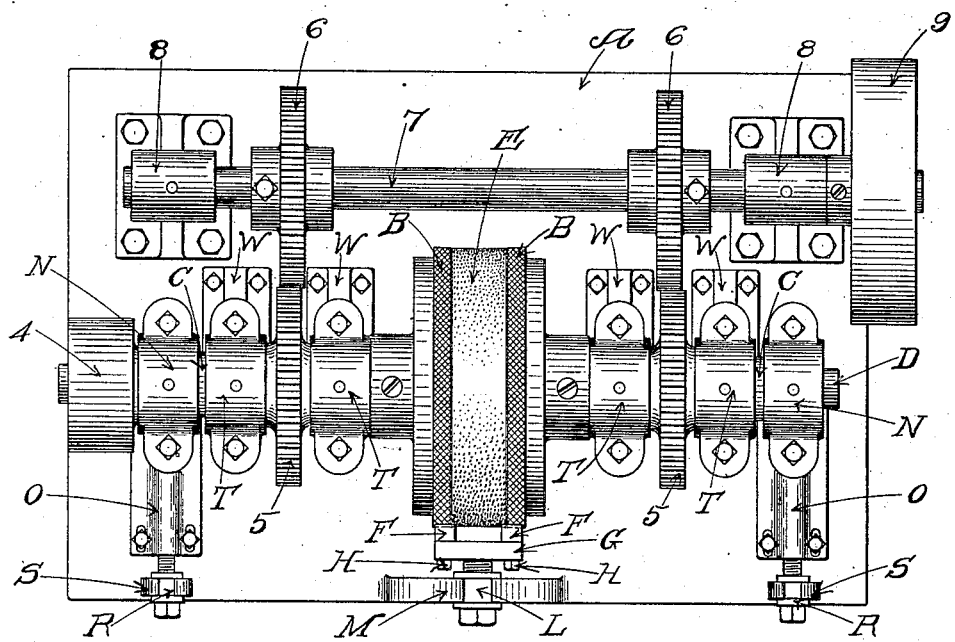
Figure 2:
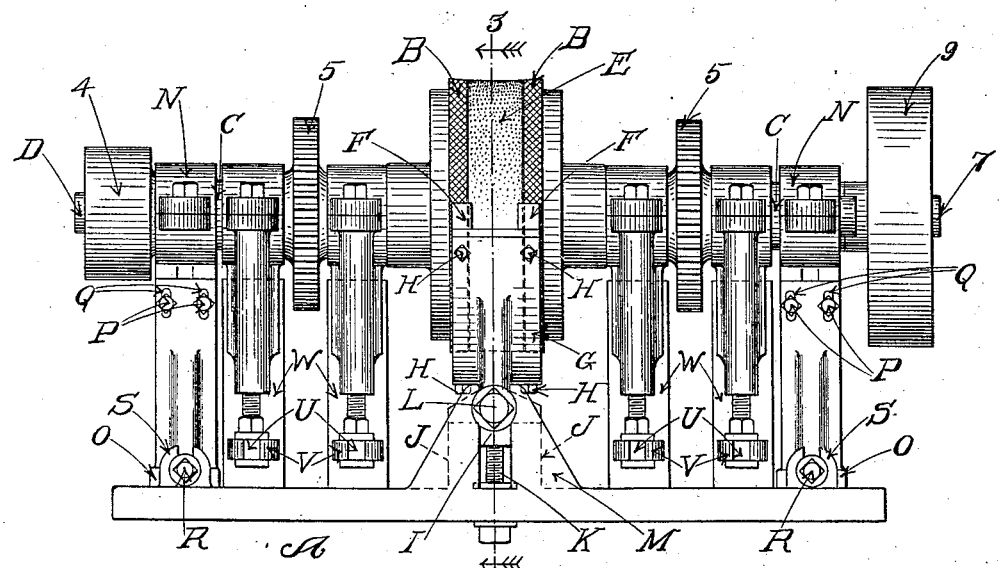
Figure 4:
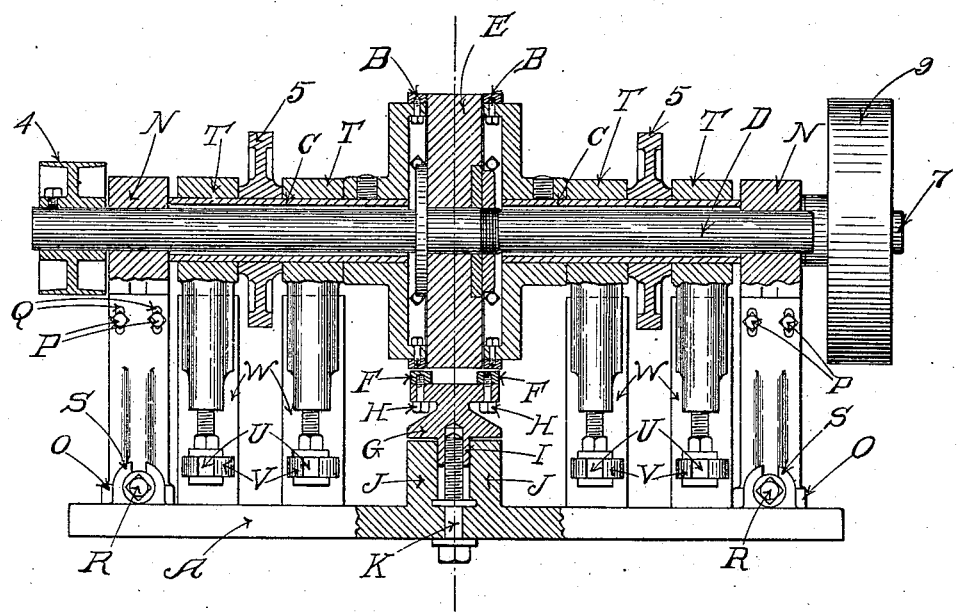
Figure 3:
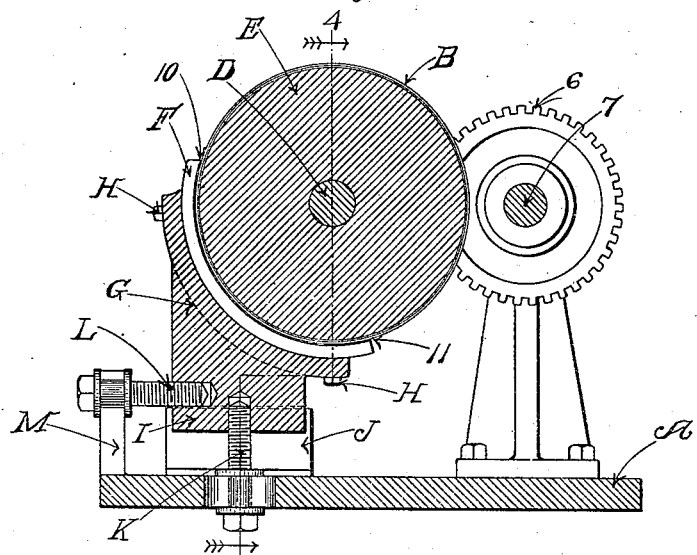

Referring to the drawings, Figure 1 is a plan, and Fig. 2 a side elevation, of a machine embodying the invention. Fig. 3 is a vertical section on line 3 3, Fig. 2. Fig. 4 is a section on line 4 4, Fig. 3, looking in the direction of the arrows.

In the drawings, A designates a base-plate upon which the various parts of the machine are supported. The operative parts of the machine consist of fixed and rotating abrading members between which the toothpick is caused to rotate and by the action of which the toothpick-blank is transformed from square to circular cross-section. The rotating abrading members comprise a pair of files B B, each mounted on a sleeve C, (see Fig. 4,) which is somewhat larger than the shaft D, upon which is mounted the third or intermediate rotating abrading member E, which comprises a wheel covered with corundum or other suitable abrading material. This novel arrangement of the sleeves C C and shaft D enables us to have the three movable abrading members located in close proximity to each other and also to adjust their positions with regard to each other.

The various abrading-surfaces employed in our machine may be made from various materials well known to those skilled in the art. The rotating abrading members B B and E coöperate with a concave shoe or fixed abrading member, which extends about a portion of the circumference of the said rotating abrading members. This shoe is provided with a pair of fixed files F F, attached to the holder G by the cap-screws H.

In order that the holder G and the files F thereon may be adjusted with relation to the rotating abrading members, we form a lug I on the said holder, this lug I being adapted to move in the slide or ways J fast to the frame of the machine. Vertical movement is given the holder by means of the bolt K. A horizontal adjustment for the holder is similarly provided by means of the bolt L, engaging the lug M, fast to the base-plate upon the machine.

The shaft D, upon which the intermediate rotating abrading member or wheel E is located, is mounted in adjustable bearings, comprising boxes N N and base-pieces O O, vertical adjustment for these being provided by means of the cap-screws P and slots Q, The said bearings for the shaft D are also adjustable horizontally on the bed-plate A by means of the adjusting-screws R R, engaging the lugs S on the base of the machine.

The sleeve C, upon which the rotating files B are mounted, has an interior diameter somewhat greater than the diameter of the shaft D, so that the shaft D and the said sleeve C may be adjusted slightly with regard to each other, this adjustment being convenient to compensate for the different wear of the abrading members due to the fact that the surfaces are composed of different materials, and for other purposes. To assist in obtaining this adjustment, each sleeve C is mounted in bearings T, which are adjustable vertically by means of the adjusting-screws U U, engaging the lugs V V, formed on the sides of the posts W, which are attached to the base-plate A of the machine by the cap-screws. From the foregoing it will be seen that the sleeves are adjustable vertically and the main shaft is adjustable both horizontally and vertically.

The main shaft D is driven by a belt on the pulley 4. Each of the sleeves C is provided with a gear 5, located between the bearings T T. The said gears 5 mesh with a pair of gears 6 6, located on a counter-shaft 7, which is supported at the back of the machine in the bearings 8. This counter-shaft is driven by a belt on the pulley 9. The shaft D and the intermediate abrading-wheel E thereon are driven at a high rate of speed—for example, three thousand revolutions per minute—while the sleeves C and the exterior abrading members or files thereon are driven at a relatively slow rate of speed—as, for example, one hundred revolutions.

The three moving abrading members are adjusted so that their surfaces are substantially in line, and these surfaces are made very slightly concave to conform somewhat to the shape of the toothpick which it is desired to make. The stationary abrading members or files F F are also slightly concave, as seen in Fig. 4. It is found in practice that it is not necessary to make the curve formed by the surfaces of the three moving abrading members as concave as might be expected from the curve of the toothpick which it is desired to make, because the toothpick being unsupported between the two stationary abrading members F F springs somewhat, so that the ends of the toothpick are worked more rapidly than the central parts. In order that there may not be a ridge or mark left by the space between the files B and the central wheel E, we make the two stationary files F to overlap slightly the said space between the said moving abrading members.

The different circumferential speeds given to the exterior rotating abrading members B B as compared with the interior abrading member E cause the toothpick-blank to rotate rapidly about its own axis as it passes between the moving and fixed abrading members and causes it to be rapidly polished and finished to the desired shape. The blanks are inserted between the abrading members at the point 10 on Fig. 3 and leave the machine at the point 11.

We claim as our invention—

1. A toothpick-finishing machine comprising a fixed abrading member and rotating abrading members having different circumferential speeds and coöperating therewith.

2. In a toothpick-finishing machine, the combination with a fixed member provided with abrading-surfaces, one for each end of the toothpick, of rotating abrading members having different circumferential speeds and coöperating with the said fixed members.

3. In a machine for finishing toothpicks, the combination of abrading members rotating with different circumferential speeds and a fixed member provided with an abrading-surface overlapping the space between the said moving members.

4. A toothpick-finishing machine comprising a fixed abrading member and rotating abrading members having different circumferential speeds and coöperating therewith, the contours of said abrading members forming a space between the same corresponding in shape to the shape of the toothpick.

5. In a toothpick-finishing machine, the combination of a shaft having an abrading-wheel thereon, a pair of sleeves about the said shaft on opposite sides of said abrading-wheel, abrading members upon the said sleeves and adjacent the said abrading-wheel, means for rotating said abrading-wheel and means for rotating said sleeve-supported abrading members independently of the said abrading-wheel, and a fixed abrading member coöperating with the before-mentioned abrading members.

6. In a toothpick-finishing machine, the combination of a shaft having an abrading-wheel thereon, a pair of sleeves about the said shaft having an interior diameter greater than the diameter of the shaft, abrading members upon the said sleeves and adjacent the said abrading-wheel, an abrading-shoe coöperating with the before-mentioned abrading members, means for actuating the moving abrading members, and means for adjusting the axes of the said sleeve and shaft relatively to each other.

7. In a toothpick-finishing machine, the combination of a shaft having an abrading-wheel thereon, a pair of sleeves about the said shaft having an interior diameter greater than the diameter of the shaft, abrading members upon the said sleeves and adjacent the said abrading-wheel, an abrading-shoe coöperating with the before-mentioned abrading members, means for actuating the moving abrading members with different circumferential speeds, and means for adjusting the axes of the said sleeve and shaft relatively to each other.

8. In a toothpick-finishing machine, the combination of a shaft having an abrading-wheel thereon, a pair of sleeves about the said shaft on opposite sides of said abrading-wheel and having an interior diameter greater than the diameter of the shaft, abrading members upon the said sleeves and adjacent the said abrading-wheel, means for rotating said shaft-supported wheel, means for rotating said sleeve-supported abrading members independently of the shaft-supported abrading-wheel, an abrading-shoe coöperating with the before-mentioned abrading members, and means for independently adjusting said rotary abrading members relatively to each other and to the shoe.

9. In a toothpick-finishing machine, the combination of a shaft having an abrading-wheel thereon, a pair of sleeves about the said shaft on opposite sides of said abrading-wheel and having an interior diameter greater than the diameter of the shaft, abrading members upon the said sleeves and adjacent the said abrading-wheel, means for rotating said shaft-supported wheel and said sleeve-supported abrading members independently of each other, an abrading-shoe coöperating with the before-mentioned abrading members and means for adjusting the axes of said rotary abrading members relatively to each other.

10. In a toothpick-finishing machine, three rotating abrading members, the axial contours of which are in line with each other, comprising two end members and an intermediate member, the two end members rotating independently of the intermediate member, the said intermediate member operating to abrade the body portion of the toothpicks and the two end members operating to abrade the portions of the toothpicks at each end of the body portion and a fixed member coöperating with all of said rotating members.

11. In a toothpick-finishing machine, a rotary shaft having an abrading-wheel thereon, two sleeves surrounding said shaft, one on each side of said abrading-wheel, an abrading-wheel fixed to each of said sleeves, means for rotating said sleeves and abrading-wheels carried thereby independently of the abrading-wheel on the said shaft, and a fixed abrading member coöperating with all of said abrading-wheels.

12. In a toothpick-finishing machine, a series of three rotating abrading members, the two end members rotating independently of the intermediate member, the axial contour of the combined rotating members forming a concave, the intermediate member of which engages to abrade the body portion of the toothpicks and the two end members of which are adapted to abrade the portions of the toothpicks on each side of the body portion and a fixed abrading member coöperating with all of said rotating members.

13. In a toothpick-finishing machine, a series of three rotary abrading members, one on each side of an intermediate member and adjacent thereto, means for rotating the two end members independently of the intermediate member, an opposing fixed abrading member having two abrading-surfaces with a clear space between them, one of the abrading-surfaces on the fixed member coöperating with the rotary abrading member at one end of the series and with a portion of the abrading-surface of the intermediate rotary abrading member and the other abrading-surface on the fixed member coöperating with the rotary abrading member at the other end of the series and with a portion of the abrading-surface of the intermediate rotary abrading member.

14. In a toothpick-finishing machine, a series of rotating abrading members whose peripheries are transversely in line with and adjacent to each other, and an opposing abrading member having thereon two abrading-surfaces with a clear space between them.

In testimony whereof we affix our signatures in presence of two witnesses.

WILLIS W. TAINTER.
GEORGE P. STANLEY.

Witnesses:
WM. A. MACLEOD,
ALICE H. MORRISON.